US007967222B2

(12) United States Patent
Alexander

(10) Patent No.: US 7,967,222 B2
(45) Date of Patent: Jun. 28, 2011

(54) PRESSURE WASHER

(75) Inventor: Gus Alexander, Inverness, IL (US)

(73) Assignee: FNA IP Holdings, Inc., Elk Grove Village, IL (US)

( * ) Notice: Subject to any disclaimer, the term of this patent is extended or adjusted under 35 U.S.C. 154(b) by 514 days.

(21) Appl. No.: 12/080,663

(22) Filed: Apr. 3, 2008

(65) Prior Publication Data

US 2008/0245425 A1 Oct. 9, 2008

Related U.S. Application Data

(60) Provisional application No. 60/921,575, filed on Apr. 3, 2007.

(51) Int. Cl.

| | |
|---|---|
| ***B05B 9/01*** | (2006.01) |
| ***F04B 53/00*** | (2006.01) |
| ***B62B 1/12*** | (2006.01) |
| ***B62B 1/00*** | (2006.01) |
| ***B62B 11/00*** | (2006.01) |

(52) U.S. Cl. ........ 239/532; 239/146; 239/525; 417/234; 280/47.315; 280/47.371; 280/655.1

(58) Field of Classification Search .................. 239/146, 239/172, 332, 525, 526, 532; 280/47.315, 280/47.371, 655.1; 16/113.1, 405, 411, 429, 16/430; 190/18 A, 115, 117; 417/234
See application file for complete search history.

(56) References Cited

U.S. PATENT DOCUMENTS

| | | | | |
|---|---|---|---|---|
| 5,429,306 | A * | 7/1995 | Schneider et al. ............ | 239/154 |
| 5,943,936 | A * | 8/1999 | Deliman et al. .............. | 190/115 |
| 2004/0046044 | A1 * | 3/2004 | Bennett et al. ................ | 239/146 |

* cited by examiner

*Primary Examiner* — Darren W Gorman
(74) *Attorney, Agent, or Firm* — Cook Alex Ltd.

(57) ABSTRACT

A pressure washer is provided including a housing. A pump is contained within the housing for pressurizing fluid received through a water inlet port and for pumping the pressurized fluid through an outlet port. An application wand is connected to the water outlet for outputting a pressurized stream of fluid. At least one wheel is supported on the housing so as to enable rolling movement of the housing. A first handle is arranged on the housing for movement between a retracted position in which a gripping portion of the handle is arranged relatively closer to the housing and an extended position in which the gripping portion of the handle is arranged relatively further away from the housing.

20 Claims, 7 Drawing Sheets

PRESSURE WASHER

FIELD OF THE INVENTION

The present invention relates generally to pressure washers, and more particularly, to electric or gasoline-powered pressure washers commonly used for household power spraying and washing applications.

BACKGROUND OF THE INVENTION

Electric-powered pressure washers have become increasingly popular for use in household cleaning applications, including cleaning decks, patios, siding, automobiles, and the like. Such pressure washers now are economically manufactured and available to the consumer market in most hardware and home improvement retail stores. Such electric-powered pressure washers basically comprise a movable cart or stand, a water pump, an electric motor for powering the pump, and a spray wand and nozzle assembly. Operation of the pressure washer, following coupling of a common garden hose between a home water outlet and the inlet to the pressure washer pump, generates a high pressure liquid discharge up to 1000 psi and more, for power spraying applications.

While such electric-powered pressure washer must be connected to an electrical outlet, the pressure washer typically is moved by the user from location to location during usage. For this purpose, it is common for the housing of the pressure washer to have a handle which permits the user to lift and carry the pressure washer from location to location. Alternatively, the housing may be supported on wheels and be provided with an upwardly-extending pull handle which enables the pressure washer to be tipped and rolled from location to location. It can be tiresome, of course, for the user to repeatedly lift and carry the wheeless pressure washer. On the other hand, the upstanding pull handle of wheel pressure washers usually requires that the pressure washer and handle be shipped and packaged in disassembled condition, requiring assembly by the customer, which can be inconvenient or cumbersome. Upon assembly, the upstanding handle also can impede compact storage of the pressure washer in the home. Pressure washers manufactured for the consumer market also often are less resistant to abusive handling. If a wheeled pressure washer is forcefully pushed into an obstruction, the wheels or their mounting can be damaged. Items forcefully wedged between the wheels and housing also can inflict damage to the wheel mounting.

OBJECTS AND SUMMARY OF THE INVENTION

It is an object of the present invention to provide a wheeled pressure washer having a pull handle that can be pre-assembled by the manufacturer, but yet facilitates compact shipping of the pressure washer by the manufacturer and storage by the user.

Another object is to provide a pressure washer as characterized above which has a pull handle that facilitates both lifting and rolling of the pressure washer during usage.

A further object provided by a wheeled pressure washer of the above kind which has a handle that can be stored in a retracted position that facilitates carrying of the pressure washer and which can be selectively moved to an extended position to facilitate rolling movement of the pressure washer.

Yet another object provides a pressure washer of the foregoing type in which the pull handle forms part of a stationary lifting handle when in a retracted position.

Still a further object is to provide a pressure washer of such type in which the handle is protectively contained from exposure to liquids and contaminants while in a stored position.

Another object provides such wheeled pressure washer in which the wheels are protected from and less susceptible to damage from obstructions during rolling movement of the pressure washer.

Other objects and advantages of the invention will become apparent upon reading the following detailed description and upon reference to the drawings, in which:

Figure 1:
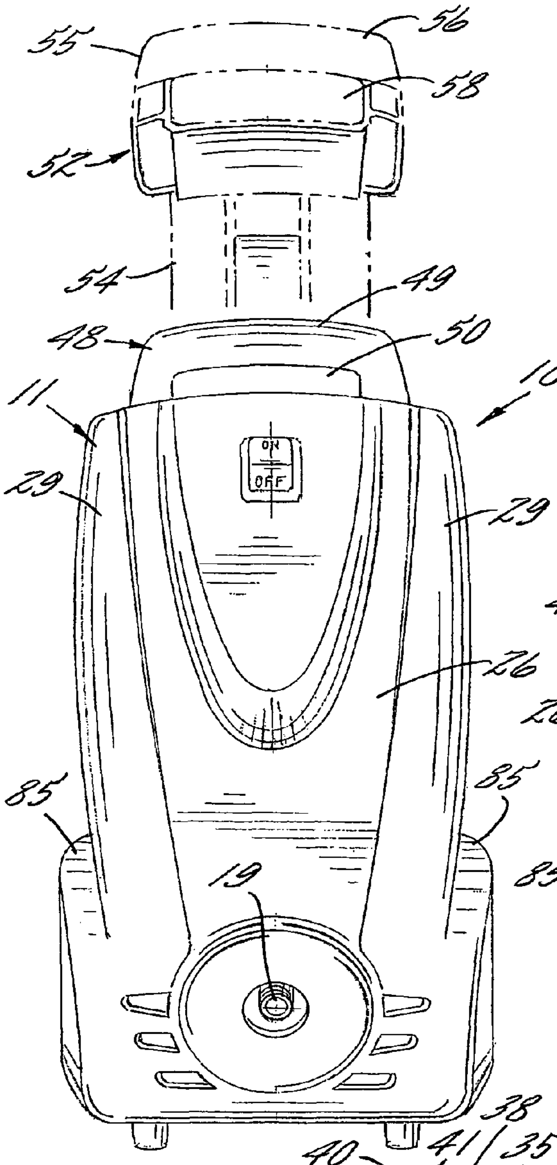
FIG. 1 is a front elevational view of a pressure washer in accordance with the invention.
Figure 2:
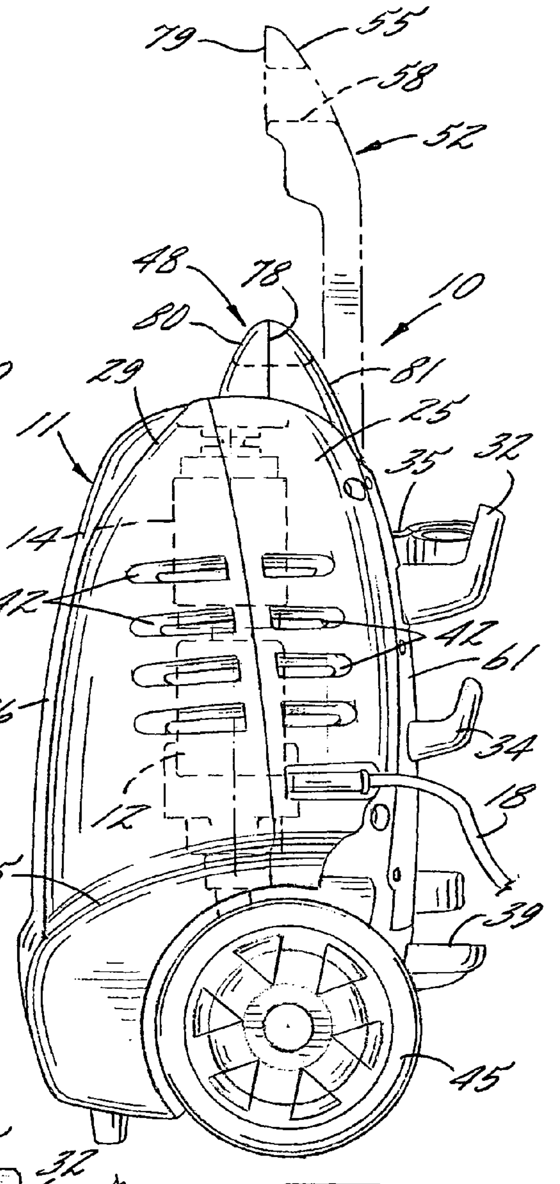
FIG. 2 is a side elevational view of the illustrated pressure washer.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF PREFERRED EMBODIMENTS

Referring now more particularly to the drawings, there is shown an illustrative pressure washer 10 in accordance with the invention which basically includes a housing or body 11, preferably molded of plastic, that houses a liquid pump 12 and electric-powered motor 14 for operating the pump 12, and a operator lance wand 15 (FIG. 4) for connection to the pressure washer via a high pressure fluid transfer hose 16. The motor 14 and pump 12 may be of a conventional type, and the motor 14 has an electric cord 18 which can be connected to an electrical outlet by a suitable extension cord for permitting movement of the pressure washer 10 by an operator during usage.

The pump 12 has an inlet 17 on a rear side of the housing 11 connectable to a liquid supply source, such as a home water outlet, by a garden hose or the like and an outlet 19 on a front side to which the high pressure hose 16 is connectable. A nozzle 20 of a selected type is mountable on the operator wand 15, which typically includes a hand operated trigger valve 21 for allowing the operator to controllably direct a stream of pressurized liquid toward a substrate surface for cleaning. The high pressure hose 16 preferably has a reinforced construction, such a disclosed in U.S. Pat. No. 5,964,409, the disclosure of which is incorporated herein by reference. The hose 16 and wand 15 each may be provided with conventional fittings and couplings to effect appropriate fluid tight connections therebetween. While the illustrated pressure washer is powered by an electric motor, it will be understood that alternatively the pressure washer may be powered by a gasoline operated motor.

The pressure washer housing 11 in this case has a two-part construction comprising a rear body portion 25 and a forwardly-mounted cover portion 26. The illustrated electric motor 14 and pump 20 are mounted on the rear body portion 25 by appropriate fastening bolts or the like. The rear body portion 25 in this instance has a central rear vertical wall 28 (FIGS. 8A-8B) upon which the pump and motor are mounted and forwardly extending side walls 29 which define a cavity within which the pump and motor are partially contained. The forward cover 26 portion similarly has a front wall and rearwardly-extending side walls which define a cavity that mates with the rear body portion 25 for receiving and containing the motor and pump.

Figure 3:
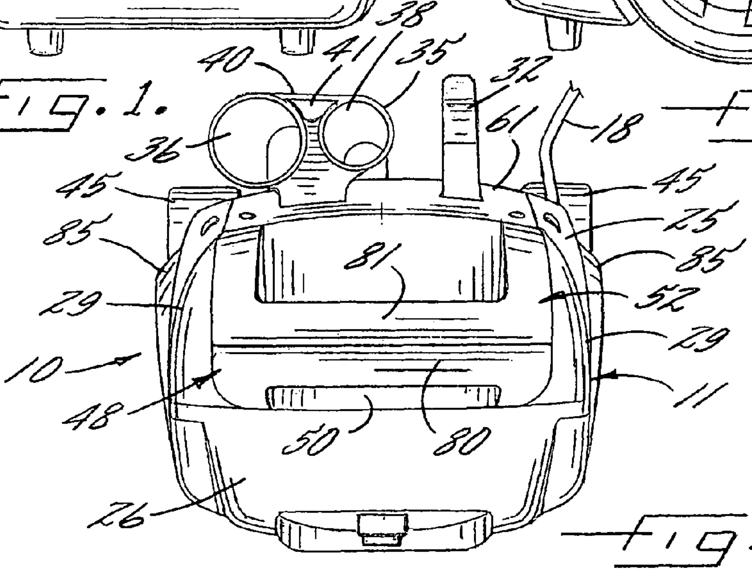
FIG. 3 is a top view of the illustrated pressure washer.
Figure 4:
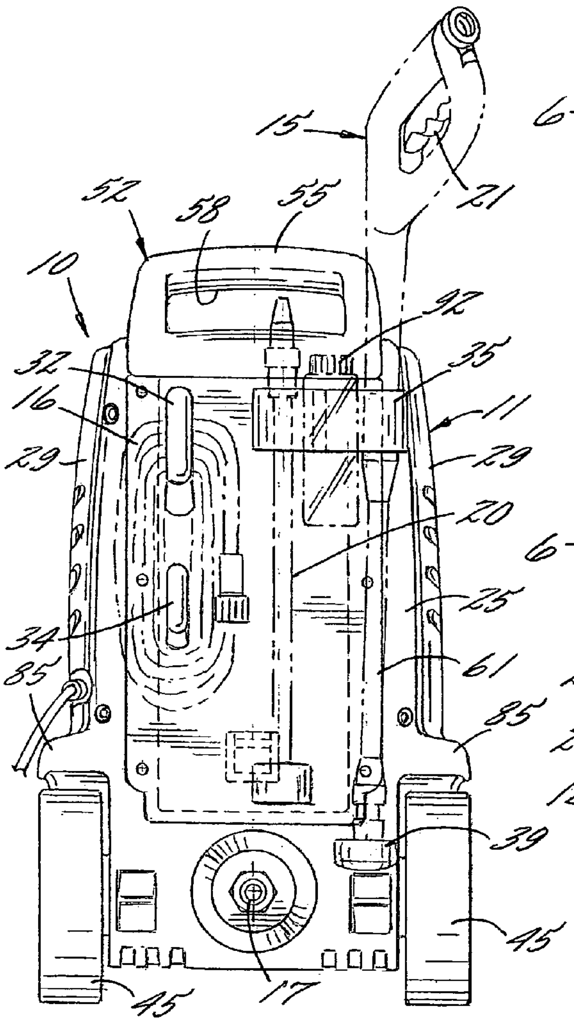
FIG. 4 is a rear view of the illustrated pressure washer.

For supporting the hose 16 and cord 18 during storage of the pressure washer, upstanding hooks 32, 34 are mounted rearwardly of the rear body portion 25 over which the cord 18 and hose 16 may be hung for storage. A receptacle 35 also mounted rearwardly of the rear body portion 25 is formed with openings 36, 38 (FIG. 3) for receiving and supporting the wand 15 and spray nozzle 20 in depending relation during storage, as depicted in FIG. 4. An upwardly facing receptacle 39 is mounted near the bottom of the rear body portion 25 for supporting the depending end of the control wand 15. A support flange 40 in this case extends between the receptacle openings 36, 38 for defining a hook receiving opening 41 for a chemical or cleaning solution bottle for use with the pressure washer in a conventional manner. The side walls of the rear body portion 25 and forward cover portion 26 in this instance are formed with air ventilation openings 42 communicating with the motor containing cavity within the housing.

For facilitating rolling movement of the pressure washer 10 during usage by an operator, the housing 11 is supported by a pair of wheels 45. The wheels 45 in this case are mounted on stationary axles fixed on the rear body portion 25 adjacent a rear side of the housing 11.

In accordance with one aspect of the invention, the pressure washer has a handle arrangement that facilitates lifting and carrying of the pressure washer during usage, as well as rolling movement. To this end, the pressure washer housing 11 has a stationary lifting handle 48 extending upwardly from the rear body portion 25. The handle 48 in this case has inverted U-shape which defines a horizontal gripping bar 49 and a clearance space 50 within which the hand of an operator can be positioned for gripping the handle. It will be understood that the stationary handle may be mounted on the rear body portion 25 or alternatively formed as an integral part of the rear body portion 25. The stationary lifting handle 48, as indicated above, is convenient for lifting and carrying of the pressure washer 10. It is not convenient, however, for pulling and rolling of the pressure washer along a floor surface since it would necessitate the operator bending over considerably during such movement of the pressure washer.

In keeping with the invention, the pressure washer 10 further has a pull handle 52 that is selectively extendible from a retracted position to an extended position that enables the operator to easily grasp and pull the pressure washer along a floor surface without awkward bending movement. The illustrated pull handle 52 comprises an elongated plate 54 having a gripping handle 55 at an upper thereof. The elongated plate 54 is located in substantially parallel relation to the rear wall 28 of the rear body portion 25 and the gripping handle 55 has an inverted U-shape comprising a gripping bar 56 that again defines a horizontal hand gripping opening 58. The pull handle plate 54 is formed with a grid of forwardly extending reinforcing ribs 59 for enhancing the rigidity of the pull handle.

Figure 5:
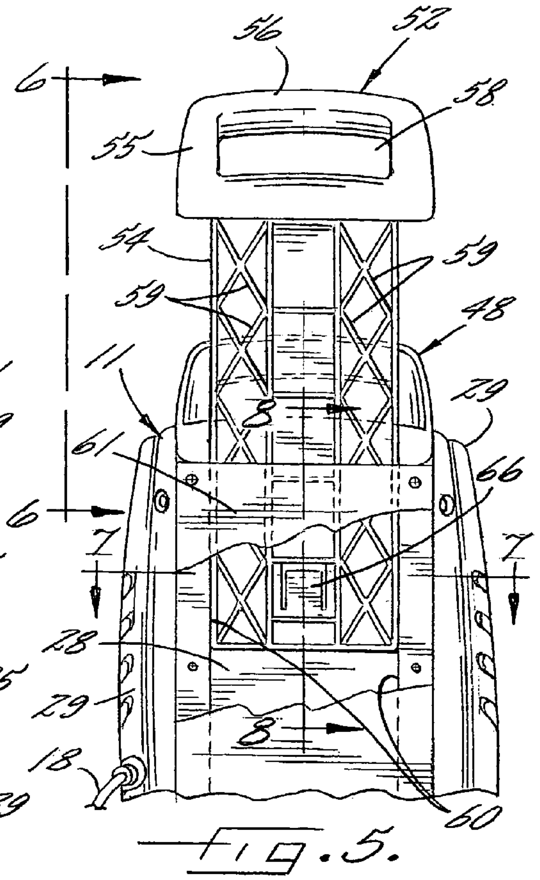
FIG. 5 is a partially broken away view of the illustrated pressure washer showing the pull handle thereof in a raised position.
Figure 7:
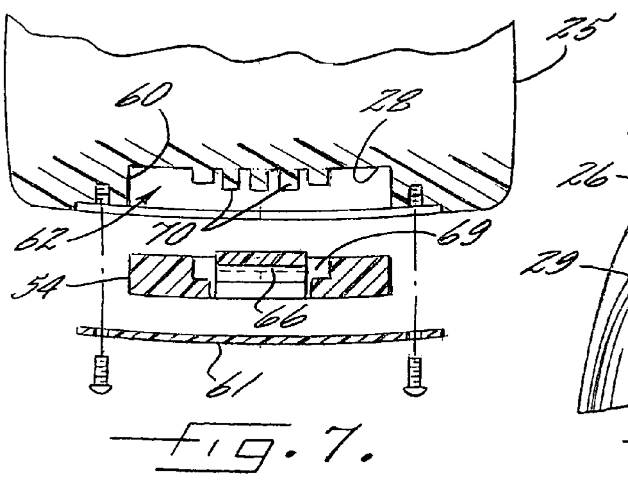
FIG. 7 is an enlarged fragmentary section taken in the plane of line 7-7 in FIG. 5.
Figure 6:
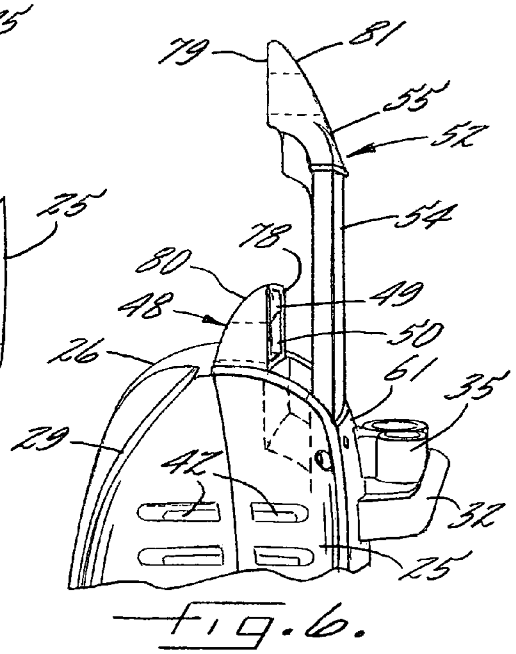
FIG. 6 is a partial side view of the pressure washer with the pull handle in an extended position as shown in FIG. 5.
Figures 8A, 8B, 8C:
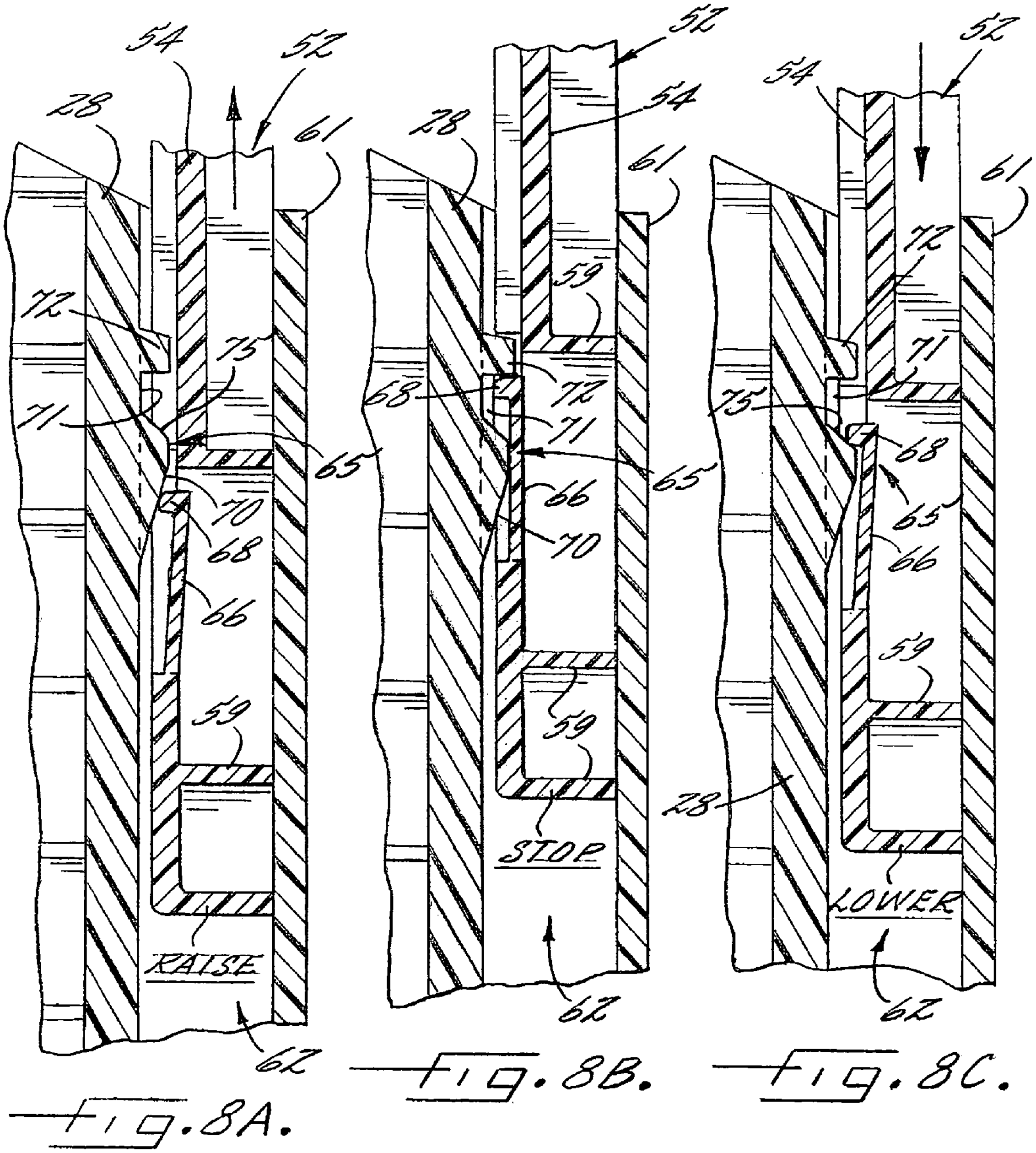
FIGS. 8A-8C are enlarged fragmentary sections showing movement of the pull handle between extended and retracted positions.

For supporting the pull handle 52 for movement between extended and retracted positions, the rear body portion 25 of the housing 11 is formed with a rearwardly-facing recess or track 60 (FIG. 5) complimentary to the shape of the elongated plate 54 for guiding vertical movement of the elongated plate 54, as depicted in FIGS. 8A-8C. The rear body portion 25 has a rear cover panel 61 fixed over the recess or track 60 for defining an upwardly-opening containment and sliding chamber 62 for the pull handle plate 54. It will be appreciated that the chamber 62 substantially encloses the elongated pull handle plate 54 while in a retracted position and, hence, protects the pull handle and its guide track from water and contaminants during usage of the pressure washer.

For limiting outward extended movement of the pull handle 52, a latching mechanism 65 is provided between a rear side of the body portion wall 28 and the front side of the pull handle plate 54. The pull handle plate 54 is formed with an upwardly extending flexible latching flange 66 having a forwardly extending guide and locking rib 68 at an upper end thereof. The latching flange 66 preferably is integrally formed with the pull handle plate 54 and disposed within a recess 69 of the plate 54 for enabling rearwardly biased rearward movement relative to the rear wall 28. The body portion rear wall 28 in this case is formed with a rearwardly extending camming ledge 70 for urging the flexible latching flange 66 of the pull handle in a rearward direction in response to lifting movement of the handle until reaching a raised position at which the locking rib 68 of the flange 66 springs forwardly into a locking recess 71 defined above the camming flange 70. A rearwardly extending ledge 72 of the housing wall 28 disposed above the latching recess 71 is engageable by the pull handle latching rib 68 to limit upward pullout movement of the pull handle 52. Hence, it can be seen that the pull handle 52 can be raised to a predetermined extended position by lifting and pulling the handle 52.

To lower the handle 52 to its retracted stored position, a downward force on the pull handle 52 will urge the locking rib 68 over an inclined ramp 75 that defines a lower wall of the locking recess 71 allowing it to ride over the camming ledge 70 as the pull handle 52 is lowered to its stored position. It will be appreciated by one skilled in the art that in such retracted position, the pressure washer 10 may be more compactly stored. In addition, the pull handle 52 may be factory installed and shipped in such retracted position, thereby eliminating the need for assembly by a customer upon purchase.

In keeping with a further aspect of the invention, the gripping handle 55 of the pull handle 52 and stationary lifting handle 48 are formed to blend together when the pull handle 52 is in a retracted position to define a unitary, easy-to-grasp lifting handle composite. In this case the stationary lifting handle 48 and the gripping handle 55 are formed with adjacent vertically mating faces 78, 79 and have similarly contoured forward 80 and rear faces 81, respectively, for defining a handle assembly which can be singularly grasped when lifting and carrying the pressure washer. The blending of the handles 48, 55 further provide a streamlined and aesthetic appearance when the pull handle 52 is in its stored retracted position. On the other hand, when rolling movement of the pressure washer is more convenient, the pull handle 52 may be easily raised.

In keeping with a further aspect of the invention, the pressure washer housing wheels 45 are recessed and protectively contained within the housing 11 for minimizing damage from impact with obstructions or with items being forcefully wedged between the wheels and the housing that can inflict damage to the wheel mountings. To this end, in the illustrative embodiment, the pressure washer housing 11 is formed with contoured outwardly flared fenders 85 which encompass a substantial portion of the outer circumferences of the wheels 45 and protect the wheels from damaging impact. The fenders 85 in this case are formed in the rear and forward body portions 25, 26 in encompassing relation to the outer circumferences of the wheels. In this case the fenders 85 are disposed in close complementary relation to the outer circumference of the wheels and encompass an arc of at least 120° of the wheel circumferences. The wheels 45 are substantially protected from impact with obstructions when the pressure washer is being moved in a forward direction, and the close spacing between the outer perimeter of the wheels 45 and the fenders 85 prevent items from being wedged between the wheel and housing. The smooth lines of curvature between the outwardly flared fenders 85 and the forward and rear sides of the pressure washer housing 11 further contribute to its aesthetic and streamlined appearance of the pressure washer.

Figure 9:
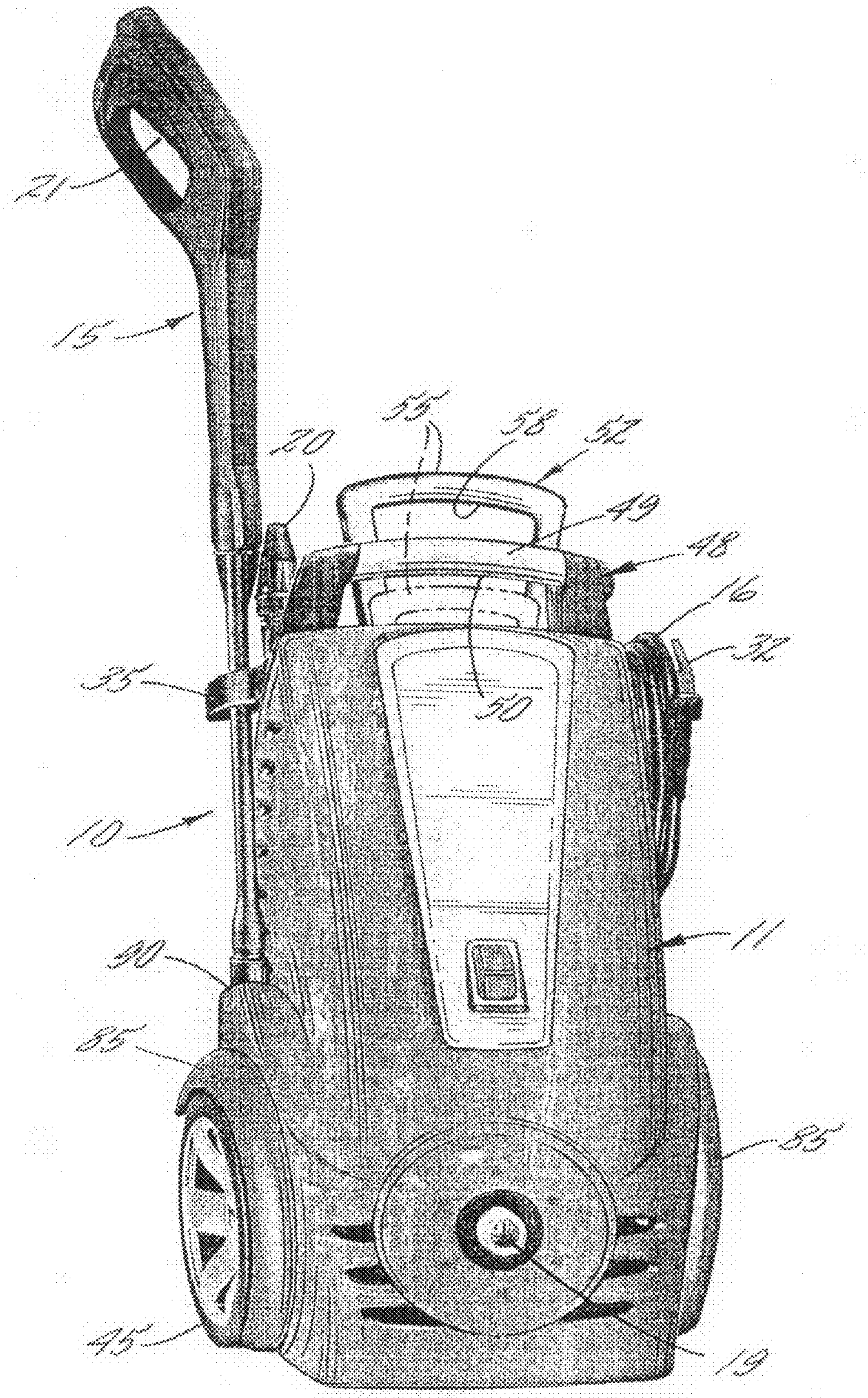
FIG. 9 is a front perspective of an alternative embodiment of pressure washer in accordance with the invention.
Figure 10:
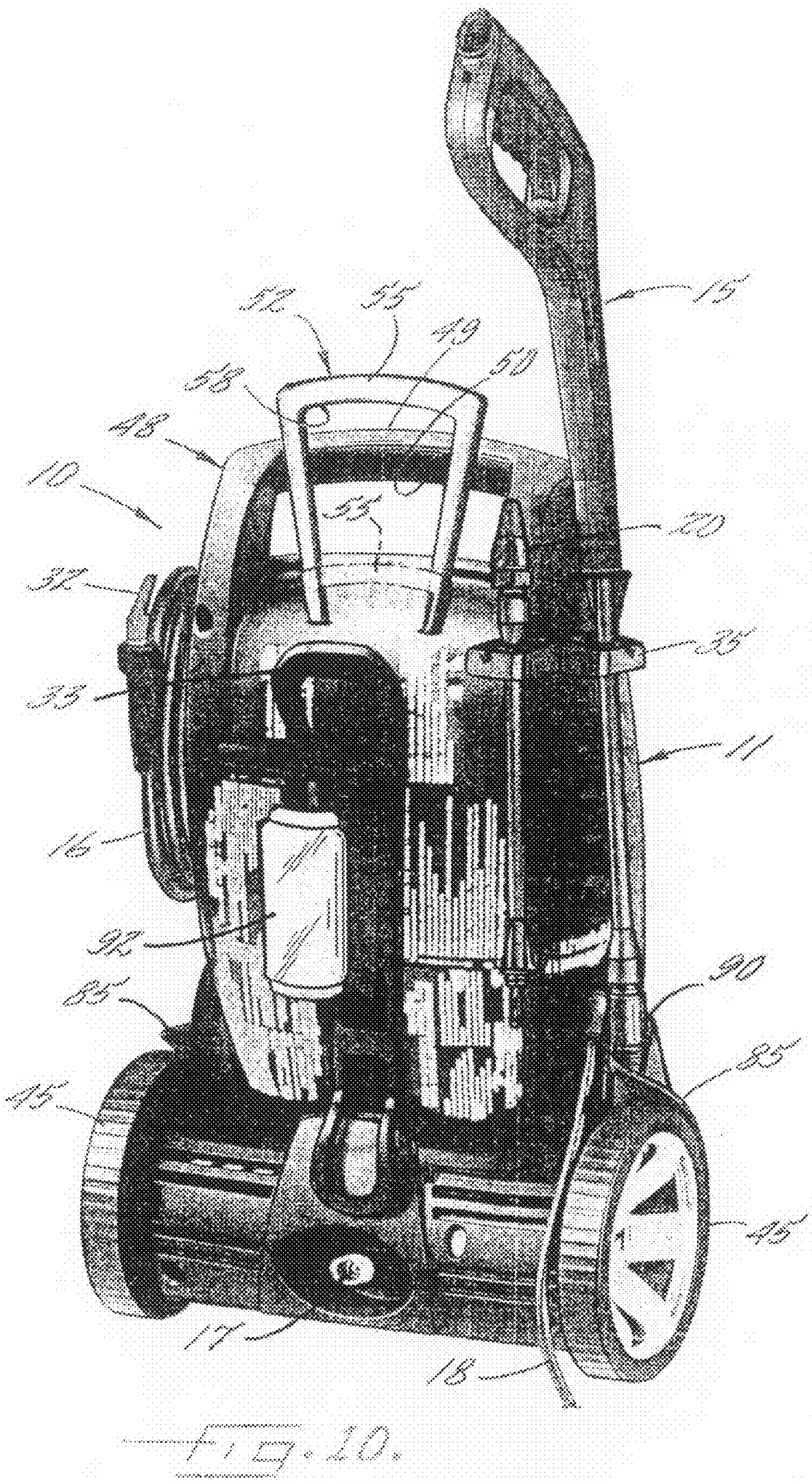
FIG. 10 is a rear perspective of the pressure washer shown in FIG. 9.

Referring to FIGS. 9 and 10, an alternative embodiment of pressure washer is shown where an item similar to those described above have been given similar reference numerals. The pressure washer 10 in this case has an extendable and retractable pull handle 52 disposed rearwardly of the stationary lifting handle 48 and has a U-shaped configuration with an upper gripping handle 55 disposed at a lower less conspicuous level than the stationary lifting handle 48. The pull handle 52 similarly is selectively extendable for facilitating pulling movement of the pressure washer and retractable into a stored position, as illustrated. A bracket 35 in this case is disposed to one side of the pressure washer for supporting a wand 15 and spray nozzle 20 in depending relation, with the lower end of the wand 15 being positionable into a recessed pocket 90 in the pressure washer housing 11. A pressure hose storage bracket 32 is located on an opposite side of the pressure washer, and a bracket 33 is mounted on a rear side of the pressure washer housing 11 for supporting and storing the electrical cord of the pressure washer when not in use. A chemical bottle 92 also is supportable on the bracket 33. Outwardly flared fenders 85 of the pressure washer housing 11 again encompass and protectively contain the wheels 45.

Figure 11:
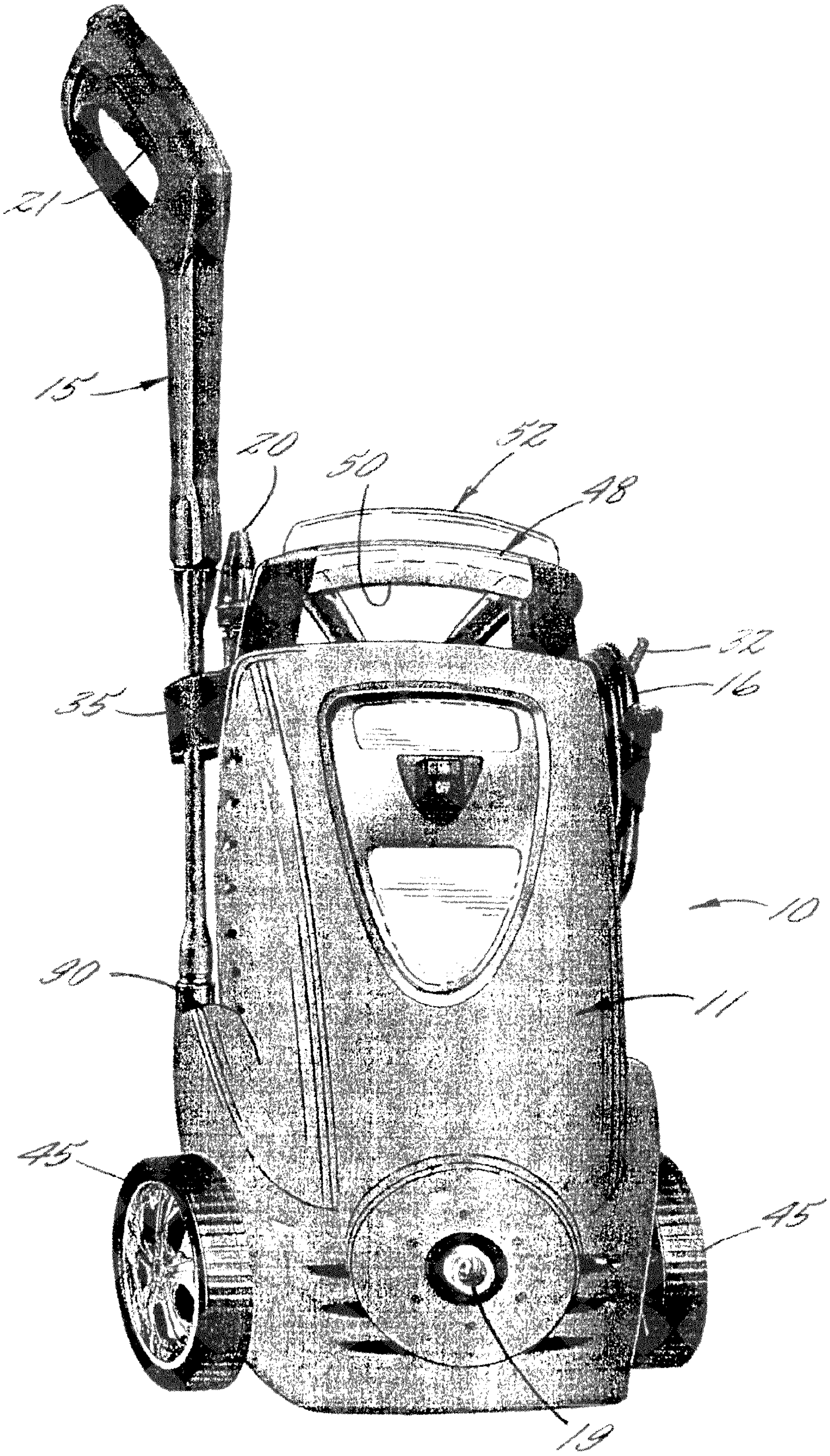
FIG. 11 is a front perspective of still another alternative embodiment of pressure washer in accordance with the invention.
Figure 12:
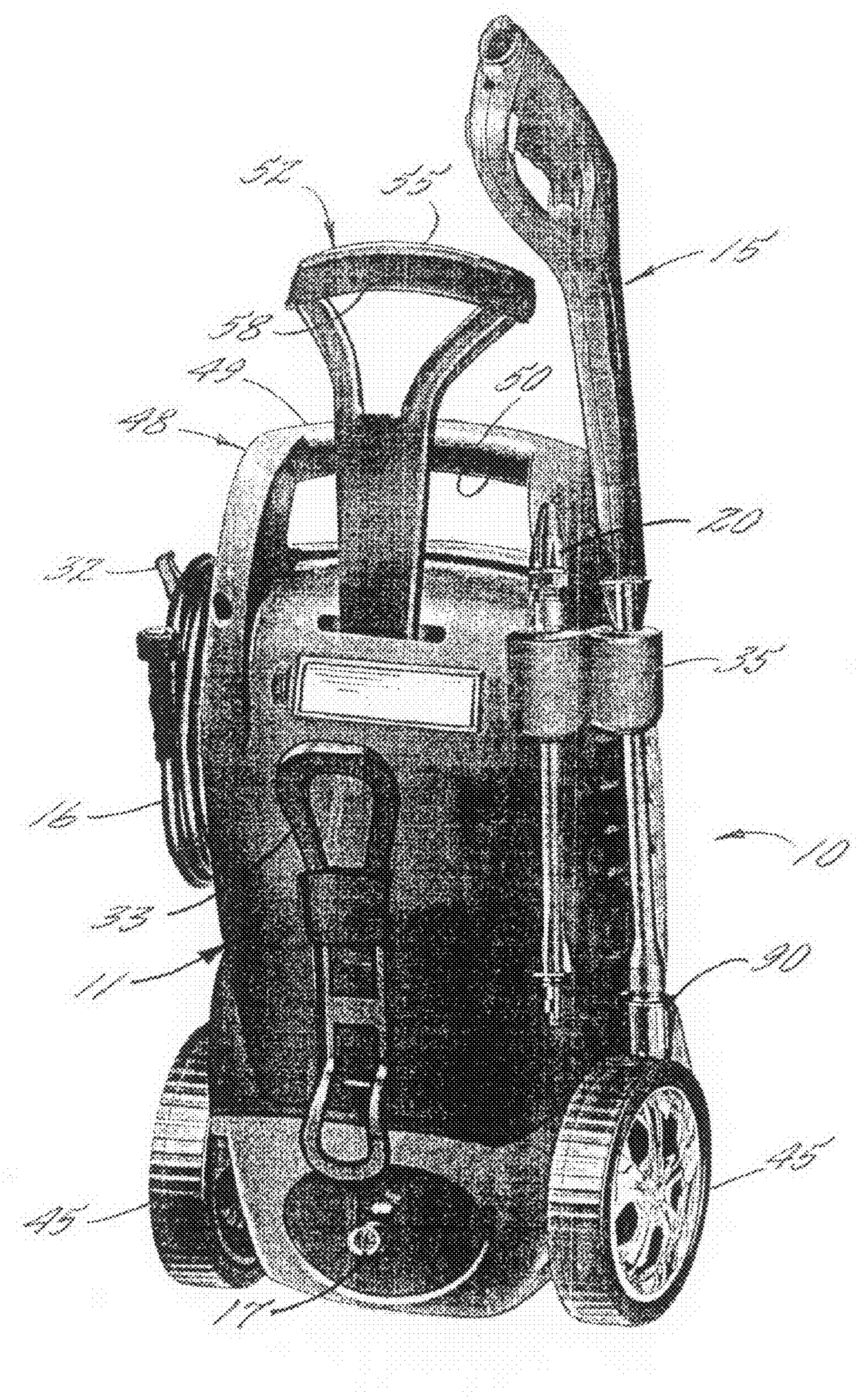
FIG. 12 is a rear perspective of the pressure washer shown in FIG. 11.

Referring now to FIGS. 11 and 12 of the drawings, there is shown another alternative embodiment of pressure washer, wherein items similar to those described above have been given similar reference numerals. The pull handle 52 is mounted for retracted and extended position in rearwardly disposed relation to the stationary lifting handle 48. The pull handle 52 in this case is positioned slightly above the stationary lifting handle 48 when in a retracted position for easy access. The spray wand and spray nozzle supporting receptacles 35 in this instance are disposed on one side of the pressure washer housing 11, and a high pressure hose supporting hook 32 is disposed on an opposite side. Rearward brackets 33 are provided for supporting the electric cord in a wound condition. The wheels 45 of the pressure washer in this case are disposed in closely-mounted relation to sides of the pressure washer housing without over encompassing fenders.

The invention claimed is:

1. A pressure washer comprising:

a housing comprising a cover, wherein the cover is on a front of the housing when the pressure washer is in an upright position;

a pump contained within the housing and being connected to an inlet port and an outlet port;

a wand connected to the outlet port;

at least one wheel supported on the housing to enable rolling movement of the housing;

a first handle having a gripping portion and being arranged in a fixed position on the housing;

a second handle movably connected to the housing and having a retracted position in which a gripping portion of the second handle is arranged adjacent the gripping portion of the first handle and an extended position in which the gripping portion of the second handle is spaced away from the first handle;

the first handle defining a first gripping opening and the second handle defining a second gripping opening; wherein when the second handle is in the retracted position the first and second gripping openings are aligned side by side and define a common gripping opening;

wherein the first and second handles are disposed fore and aft of each other respectively and the second handle remains entirely rearward of the first handle when the second handle is in the retracted position.

2. The pressure washer according to claim 1 wherein the first and second handles have adjacent mating inner faces and substantially similarly contoured outer faces.

3. The pressure washer according to claim 1 wherein the second handle includes an elongated portion that is slidingly received in a complementary track in the housing to permit the second handle to move between the extended and retracted positions.

4. The pressure washer according to claim 1 further including a latching mechanism associated with the second handle that engages and prevents further extension of the gripping portion of the second handle beyond a defined distance from the housing.

5. The pressure washer according to claim 4 wherein the latching mechanism releases and permits movement of the second handle in a retraction direction when a force is applied to the second handle in the retraction direction.

6. The pressure washer according to claim 1 wherein the at least one wheel is recessed into the housing.

7. The pressure washer according to claim 1 wherein the housing includes two wheels.

8. The pressure washer according to claim 7 wherein the housing is formed with fenders adjacent the wheels.

9. A pressure washer comprising:

a housing comprising a cover, wherein the cover is on a front of the housing when the pressure washer is in an upright position;

a pump contained within the housing and being connected to an inlet port and an outlet port;

a wand connected to the outlet port;

at least one wheel coupled to the housing;

a stationary handle on the housing;

a movable handle positioned on the housing adjacent to the stationary handle, the movable handle being movable between a retracted position in which a gripping portion of the movable handle is arranged relatively closer to the housing and an extended position in which the gripping portion of the movable handle is arranged relatively further away from the housing; and wherein the gripping portion of the movable handle includes a forwardmost vertical face which faces, is aligned with and adjacent to a rearwardmost vertical face of the stationary handle when the movable handle is in the retracted position.

10. The pressure washer according to claim 9 wherein the movable and stationary handles form a single handle structure when the movable handle is in the retracted position.

11. The pressure washer according to claim 10 wherein the movable and stationary handles have similarly contoured outer faces.

12. The pressure washer according to claim 9 further comprising a first gripping opening defined in the stationary handle and a second gripping opening defined in the movable handle; wherein when the movable handle is in the retracted position the first and second gripping openings are aligned side by side and define a common gripping opening.

13. The pressure washer of claim 1 wherein the second handle is positioned at an upper end of an elongated plate that is slidably coupled to the housing.

14. The pressure washer according to claim 13 wherein the gripping portion of the second handle and elongated plate are integrally formed.

15. The pressure washer according to claim 13 wherein the elongated plate is slidably received in a complementary track associated with the housing.

16. The pressure washer according to claim 15 wherein the complimentary track is positioned within a chamber defined in the housing.

17. A pressure washer comprising:

a housing;

a pump contained within the housing and being connected to an inlet port and an outlet port;

a wand connected to the outlet port;

at least one wheel supported on the housing to enable rolling movement of the housing;

a stationary handle fixed on and extending upward away from the housing when the pressure washer is in an upright position;

the stationary handle having a gripping portion;

a movable handle slidably connected to the housing and being movable between a retracted position and an extended position;

the movable handle having a gripping portion;

wherein when the pressure washer is in the upright position and the movable handle is in the retracted position, the entire gripping portion of the movable handle is disposed on a first side of an imaginary vertical plane while the entire gripping portion of the stationary handle is adjacent to the gripping portion of the movable handle and is disposed on an opposite second side of the imaginary vertical plane.

18. The pressure washer according to claim 17 wherein the stationary handle defines a first gripping opening and the movable handle defines a second gripping opening; wherein when the movable handle is in the retracted position the first and second gripping openings are aligned and define a common gripping opening.

19. The pressure washer according to claim 17 wherein the gripping portion of the movable handle includes an inner face which faces, is aligned with and adjacent to an inner face of the stationary handle when the movable handle is in the retracted position.

20. The pressure washer according to claim 17 wherein the movable and stationary handles form a single handle structure when the movable handle is in the retracted position.

* * * * *